(12) United States Patent
Gupta et al.

(10) Patent No.: US 6,875,728 B2
(45) Date of Patent: Apr. 5, 2005

(54) METHOD FOR FRACTURING SUBTERRANEAN FORMATIONS

(75) Inventors: D. V. Satyanarayana Gupta, Calgary (CA); Eric Hughson Tudor, Calgary (CA)

(73) Assignee: BJ Services Company Canada, Calgary (CA)

( * ) Notice: Subject to any disclaimer, the term of this patent is extended or adjusted under 35 U.S.C. 154(b) by 99 days.

(21) Appl. No.: 09/984,584

(22) Filed: Oct. 30, 2001

(65) Prior Publication Data

US 2003/0008781 A1 Jan. 9, 2003

Related U.S. Application Data

(63) Continuation-in-part of application No. 09/474,149, filed on Dec. 29, 1999, now Pat. No. 6,410,489.

(51) Int. Cl.[7] ............................................. E21B 43/26
(52) U.S. Cl. .................... 507/240; 507/922; 166/308.1; 166/308.2; 175/66
(58) Field of Search .............................. 166/308, 308.1, 166/308.2; 507/922, 240; 175/66

(56) References Cited

U.S. PATENT DOCUMENTS

| | | | | |
|---|---|---|---|---|
| 2,664,954 A | * | 1/1954 | Johnson | 166/283 |
| 3,077,930 A | * | 2/1963 | Beckett | 166/280 |
| 3,361,213 A | | 1/1968 | Savins | |

(Continued)

FOREIGN PATENT DOCUMENTS

| | | |
|---|---|---|
| CA | 1180176 | 1/1985 |
| CA | 1185779 | 4/1985 |
| CA | 1266600 | 3/1990 |
| CA | 1298697 | 4/1992 |
| CA | 2148583 | 5/1994 |
| CA | 2217659 | 4/1998 |
| CA | 2309460 | 5/1999 |
| EP | 0130647 | 1/1985 |
| EP | 0189042 | 7/1986 |
| EP | 0474284 | 3/1992 |
| GB | 2 354 541 | 3/2001 |

OTHER PUBLICATIONS

McLaughlin et al. (1976)—"Aqueous Polymers for Treating Clays in Oil and Gas." Society of Petroleum Engineers 6008.

Nehmer, (1988)—"Viscoelastic Gravel–Pack Carrier Fluid." Society of Petroleum Engineers 17168.

Stewart et al. (1994)—"Use of a Solids–free Viscous Carrying Fluid in Fracturing Applications: An Economic and Productivity Comparison in Shallow Completions". Society of Petroleum Engineers 30114.

Brown et al. (1996), "Use of Viscoelastic Carrier Fluid in Frac–Pack Applications", Society of Petroleum Engineers 31114.

Weaver et al. "Application of New Viscoelastic Fluid Technology Results in Enhanced Fracture Productivity". SPE 71662.

*Primary Examiner*—Philip C. Tucker
(74) *Attorney, Agent, or Firm*—Philip C. Mendes da Costa; Bereskin & Parr (57) ABSTRACT

A method of fracturing a formation with a fracturing fluid wherein the formation has particulate material that swells or migrates upon exposure to the fracturing fluid comprises preparing a fracturing fluid comprising (1) a thickening compound comprising a first surfactant selected from the group consisting of a cationic surfactant having only a single cationic group, an amphoteric surfactant and a mixture thereof; and, an anionic surfactant; and, (2) water, wherein no or essentially no inorganic salt is added to the fracturing fluid; and using the fracturing fluid to fracture the formation. A method for recycling a fracturing fluid is also provided.

22 Claims, 3 Drawing Sheets

U.S. PATENT DOCUMENTS

| | | | |
|---|---|---|---|
| 3,578,871 | A | 5/1971 | Tetsuzo |
| 3,937,283 | A | 2/1976 | Blauer et al. |
| 4,007,792 | A | 2/1977 | Meister |
| 4,061,580 | A | 12/1977 | Jahnke |
| 4,071,457 | A | 1/1978 | Meister |
| 4,108,782 | A | 8/1978 | Thompson |
| 4,120,356 | A | 10/1978 | Meister |
| 4,148,736 | A | 4/1979 | Meister |
| 4,165,825 | A | 8/1979 | Hansen |
| 4,354,552 | A | 10/1982 | Zingg |
| 4,360,061 | A | 11/1982 | Canter et al. |
| 4,615,825 | A | 10/1986 | Teot et al. |
| RE32,302 | E | 12/1986 | Almond et al. |
| 4,695,389 | A | 9/1987 | Kubala |
| 4,725,372 | A | 2/1988 | Teot et al. |
| 4,735,731 | A | 4/1988 | Rose et al. |
| 4,770,814 | A | 9/1988 | Rose et al. |
| 4,796,702 | A | 1/1989 | Scherubel |
| 4,880,565 | A | 11/1989 | Rose et al. |
| 4,911,241 | A | 3/1990 | Williamson et al. |
| 4,975,482 | A | 12/1990 | Peiffer |
| 5,036,136 | A | 7/1991 | Peiffer |
| 5,093,448 | A | 3/1992 | Peiffer |
| 5,101,903 | A | 4/1992 | Llave et al. |
| 5,246,072 | A | 9/1993 | Frazier, Jr. et al. |
| 5,462,689 | A | 10/1995 | Choy et al. |
| 5,551,516 | A | 9/1996 | Norman et al. |
| 5,566,760 | A | 10/1996 | Harris |
| 5,964,295 | A | 10/1999 | Brown et al. |
| 5,979,555 | A | 11/1999 | Gadberry et al. |
| 5,979,557 | A | 11/1999 | Card et al. |
| 6,035,936 | A | 3/2000 | Whalen |
| 6,069,118 | A | 5/2000 | Hinkel et al. |
| 6,106,700 | A | 8/2000 | Collins et al. |
| 6,140,277 | A | 10/2000 | Tibbles et al. |
| 6,172,010 | B1 | 1/2001 | Argillier et al. |
| 6,239,183 | B1 | 5/2001 | Farmer et al. |
| 6,258,859 | B1 * | 7/2001 | Dahayanake ................ 507/922 |
| 6,283,212 | B1 | 9/2001 | Hinkel et al. |
| 6,435,277 | B1 * | 8/2002 | Qu et al. ..................... 507/922 |
| 6,468,945 | B1 * | 10/2002 | Zhang ........................ 507/922 |
| 2004/0112836 | A1 * | 6/2004 | Manz et al. ................. 210/721 |

* cited by examiner

METHOD FOR FRACTURING SUBTERRANEAN FORMATIONS

This application is a continuation in part of U.S. patent application Ser. No. 09/474,149 which was filed on Dec. 29, 1999 now U.S Pat. No. 6,410,489.

FIELD OF THE INVENTION

The present invention relates to the field of fracturing subterranean formations, such as the formations for the oil and gas wells, to increase their permeability and thereby increase the potential flow of recoverable hydrocarbons therefrom.

BACKGROUND OF THE INVENTION

In order to improve the recovery of hydrocarbons from oil and gas wells, the subterranean formations surrounding such wells can be fractured. That is, fluid can be introduced into the formations through one or more of well bores, at an elevated pressure (and preferably a pressure sufficiently high to initiate hydraulic fracturing, e.g., 5–120 Mpa) to open the pores and cracks in the formation. The fracturing fluids which are used in this operation are preferably loaded with proppants. Proppants may be any particles of hard material such as sand, which wedge open cracks or pores in the formation, and thereby increase the permeability of the formation once the pressure in the boreholes produced during the fracturing operation is released. For this reason, fracturing fluids are preferably of high viscosity, so as to be capable of carrying effective volumes of one or more proppants.

Fracturing fluids which have been used in the past include aqueous gels and hydrocarbon gels. These are produced by the introduction of cross-linkable polymers such as guar gum and hydroxy ethyl cellulose or the like. One disadvantage with such fluids is that the cross-linkable natural polymer provides a medium upon which bacteria may grow. If a bacteria colony develops in a borehole, then the colony may plug up at least part of the borehole thereby reducing the amount of hydrocarbon which can be recovered. In addition, if the bacteria produce sulphides, then the production of the sulphides can result in a sweet reservoir being converted to a sour reservoir. If this occurs, additional processing steps may be required for the hydrocarbon which is recovered from the borehole, and, in addition, corrosion issues may arise from the exposure of the process equipment to the sulphides. In addition, hydrogen sulfide gas is a poisonous gas which has associated safety concerns.

It has been proposed, for instance in U.S. Pat. No. 5,551,516, to provide a fracturing fluid with good viscosity and little residue by combining an inorganic stabilizer salt, a surfactant thickener and an organic salt or alcohol. The fluid may also comprise a gas, and thereby be in the form of a foam The fluid disclosed in U.S. Pat. No. 5,551,516 develops viscosity of between 150 and 200 cp @ 170 sec$^{-1}$ at temperature of about 40–50° C., and surfactant loadings of up to 5%.

Particulate material, e.g. clay, can swell and thereby may cause reduced permeability and/or may be dislodged during a fracturing operation. If particulate material bercomes mobile during a fracturing operation, then the particulate material can block some of the pores or fractures in the borehole thereby reducing the potential output of the borehole Accordingly, inorganic salts such as potassium chloride, calcium chloride and ammonium chloride have been added to a fracturing fluid to prevent or reduce particulate material from being dislodged during the fracturing operation Typically, at least 2 or 3 weight percent salt is added to a fracturing fluid as a clay stabilization agent. The addition of such a large amount of salt can result in increased difficulty in processing and disposing of spent fracturing fluid (i.e. fracturing fluid which is recovered from a borehole subsequent to the fracturing operation).

SUMMARY OF THE INVENTION

In accordance with the instance invention, a method of fracturing a formation has been developed wherein spent fracturing fluid is used to fracture additional boreholes. One advantage of the instant invention is that the amount of water which is required to fracture a plurality of boreholes in a single formation may be substantially reduced. Many oil and gas wells are positioned in remote locations which are distant to useable water supplies, thereby requiring the water for use in producing the fracturing fluid to be brought to the well site, such as by tanker trucks. This can substantially increase the cost of a fracturing operation as well as delay the speed at which a fracturing operation may be conducted. Further, spent fracturing fluid is typically considered contaminated and requires special disposal procedures (such as pumping it into an injection well or a disposal well). Reducing the total volume of spent fracturing fluid which needs to be disposed of simplifies post fracturing clean up operations.

In accordance with one embodiment of the instant invention there is provided a method of fracturing a formation with a fracturing fluid wherein the formation has particulate material that swells or migrates upon exposure to the fracturing fluid comprising:

(a) preparing a fracturing fluid comprising
 (i) a thickening compound comprising a first surfactant selected from the group consisting of a cationic surfactant having only a single cationic group, an amphoteric surfactant and a mixture thereof; and, an anionic surfactant, and,
 (ii) water wherein no inorganic salt is added to the fracturing fluid;

(b) using the fracturing fluid to fracture the formation.

In one embodiment, the first surfactant comprises a cationic surfactant having only a single cationic group and the cationic surfactant stabilizes particulate material in the formation In another embodiment, the first surfactant comprises a cationic surfactant having only a single cationic group that is selected from the group consisting of a linear quaternary amine, a benzyl quaternary amine and a mixture thereof and the cationic surfactant stabilizes particulate material in the formation.

In another embodiment, the first surfactant comprises a cationic surfactant having only a single cationic group that comprises a quaternary ammonium moiety and the cationic surfactant stabilizes particulate material in the formation.

In another embodiment, the first surfactant is an amphoteric surfactant and the amphoteric surfactant stabilizes particulate material in the formation.

In another embodiment, the surfactant has a hydrophobic tail portion which has a carbon chain length of from about 12 to about 18.

In another embodiment, the fluid has a viscosity sufficient to transport a proppant and the method further comprises adding a proppant prior to using the fracturing fluid to fracture the formation.

In another embodiment, the fracturing fluid comprises a viscoelastic fluid.

In accordance with the instant invention, there is also provided a method of fracturing a formation comprising.
(a) preparing a first fracturing fluid;
(b) pumping the first fracturing fluid into the formation at an elevated pressure:
(c) reducing the pressure and recovering fluid from the formation;
(d) removing suspended or entrained material from the recovered fluid; and,
(e) using the recovered fluid as a recycled fracturing fluid.

In one embodiment, the recovered fluid is used to produce the recycled fracturing fluid.

In another embodiment, the first fracturing fluid comprises:
(a) a thickening compound comprising:
(i) a first surfactant selected from the group consisting of a cationic having a single cationic group, an amphoteric surfactant and a mixture thereof; and,
(ii) an anionic surfactant; and,
(b) water and the method further comprises determining the viscosity of the recovered fluid and adding additional surfactant to the recovered fluid to obtain a predetermined viscosity.

In another embodiment, the amount of additional surfactant that is added to the recovered fluid is based only on the viscosity of the recovered fluid.

In another embodiment, steps (b)–(c) comprise a single fracturing operation and the amount of additional surfactant that is added to the recovered fluid is selected to replace surfactant which is removed from the first fracturing fluid during a single fracturing operation.

In another embodiment, the surfactant which is added to the recovered fluid essentially comprises the first surfactant In another embodiment, the method further comprises the step of limiting the salt added to the first fracturing fluid whereby the recovered fluid has a salt content of less than about 0.5 wt. % based on the total weight of the recovered fluid.

In another embodiment, the method further comprises determining the relative amounts of the first and second surfactants in the recovered fluid and adding additional surfactant to the recovered fluid to produce the recycled fracturing fluid having a predetermined viscosity In another embodiment, step (d) comprises essentially only a settling stage.

In another embodiment, steps (b)–(c) comprise a single fracturing operation and the method further comprises:
(a) determining an amount of recycled fracturing fluid that is required for a further fracturing operation; and,
(b) determining an additional amount of surfactant to be added to produce the recycled fracturing fluid having a predetermined viscosity.

In another embodiment, the additional amount of surfactant that is added to the recovered fluid is based only on the viscosity of the recovered fluid.

In another embodiment, the additional amount of surfactant that is added to the recovered fluid is selected to replace surfactant which is removed from the first fracturing fluid during a single fracturing operation.

In another embodiment, the method further comprises adding additional water to the recovered fluid to produce the amount of recycled fracturing fluid that is required for the further fracturing operation, and the additional amount of surfactant that is added to the recovered fluid is selected to replace surfactant which is removed from the first fracturing fluid during a single fracturing operation as welt as to increase the viscosity of the additional water whereby the recycled fracturing fluid has the predetermined viscosity.

In accordance with the instant invention, there is also provided a method of fracturing a formation comprising:
(a) preparing a first fracturing fluid;
(b) pumping the first fracturing fluid into the formation at an elevated pressure;
(c) reducing the pressure and recovering fluid from the formation;
(d) removing suspended or entrained material from the recovered fluid.
(e) using the recovered fluid to produce a recycled fracturing fluid; and,
(f) limiting the salt added to the first fracturing fluid whereby the recovered fluid has a salt content of less than about 0.5 wt. % based on the total weight of the recovered fluid In another embodiment, salt is not added during step (a) to produce the first fracturing fluid.

In accordance with the instant invention, there is also provided a method of fracturing a formation comprising:
(a) preparing a first fracturing fluid;
(b) pumping the first fracturing fluid into the formation at an elevated pressure;
(c) reducing the pressure and recovering fluid from the formation;
(d) subjecting recovered fluid essentially only to a settling operation to remove suspended or entrained material from the recovered fluid; and,
(e) using the recovered fluid to produce a recycled fracturing fluid.

In one embodiment, the method further comprises limiting the salt added to the first fracturing fluid whereby the recovered fluid has a salt content of less than about 0.5 wt. % based on the total weight of the recovered fluid.

In another embodiment, the method further comprises determining the viscosity of the recovered fluid and adding additional surfactant to the recovered fluid to obtain a predetermined viscosity In another embodiment, the amount of additional surfactant that is added to the recovered fluid is based only on the viscosity of the recovered fluid.

In another embodiment, steps (b)–(c) comprise a single fracturing operation and the amount of additional surfactant that is added to the recovered fluid is selected to replace surfactant which is removed from the first fracturing fluid during a single fracturing operation.

In another embodiment, the surfactant which is added to the recovered fluid essentially comprises the first surfactant.

In another embodiment, the method further comprises determining the relative amounts of the first and second surfactants in the recovered fluid and adding additional surfactant to the recovered fluid to produce the recycled fracturing fluid having a predetermined viscosity.

BRIEF DESCRIPTION OF THE DRAWINGS

These and other advantages of the instant invention will be more fully and completely understood in accordance with the description of the following drawings in which.

DESCRIPTION OF THE EMBODIMENTS

In accordance with the instant invention, a fracturing fluid is recovered from a borehole after a fracturing operation and reused in a subsequent fracturing operation. The term "fracturing operation" is used in the specification to describe a process wherein a fracturing fluid is pumped into a borehole at a pressure above the fracturing pressure of the formation (e.g 5 to 120 Mpa) and subsequently, the pressure in the borehole is reduced such as by releasing the pressure which was applied during the fracturing operation and at least some of the spent fracturing fluid is recovered from the borehole. While the description herein relates to boreholes, it is to be appreciated that the method of the instant invention may be utilized in any formation where a fluid is applied under pressure to crack, fracture or otherwise increase the porosity of the formation and all such fluid used in such a process are referred to as fracturing fluids.

In order to recycle a fracturing fluid for subsequent fracturing operations, it is necessary to first obtain a used or spent fracturing fluid. To this end, the spent fracturing fluid may be obtained from any source (e.g. it may be obtained from another production site where a fracturing operation has been conducted and transported such as by truck to the site where the spent fracturing fluid is to be recycled) or it may be produced in situ (i.e. it may be recovered from an earlier fracturing operation at the same site at which the spent fracturing fluid is to be utilized in a subsequent fracturing operation). In either case, an initial fracturing fluid or a first fracturing fluid must be prepared. The term initial fracturing fluid is used to refer to a fracturing fluid that does not have a component part that has previously been used in a fracturing operation. The term first fracturing fluid is a fluid that results in a recovered fluid. It may be an initial fracturing fluid or a fracturing fluid that has a component that has previously been used in a fracturing operation.

Figure 1:
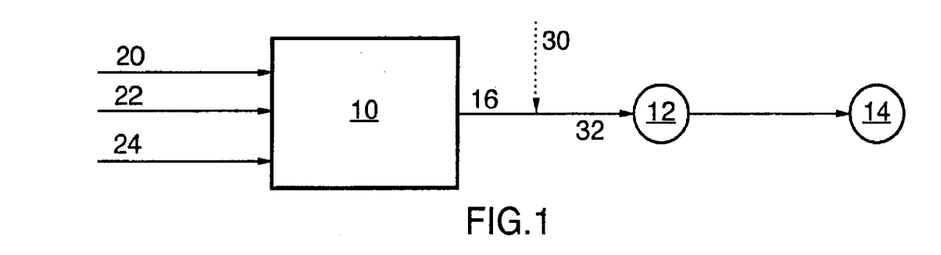
FIG. 1 is a schematic drawing of a process for producing an initial fracturing fluid in accordance with the instant invention.

As shown in the embodiment of FIG. 1, an initial fracturing fluid may be prepared by combining the requisite surfactants with water in mixing tank 10 to produce initial fracturing fluid 16. Initial fracturing fluid 16 may then be subjected to any conventional fracturing operation. For example, referring to FIG. 1, initial fracturing fluid 16 may be conveyed to one or more boreholes 14 via one or more pumps 12.

The fracturing fluid comprises a mixture of surfactants, which act as the thickening compound, and water. In those situations where a proppant is required for the fracturing operation, a proppant is also added to the fracturing fluid If a proppant is required, then the fracturing fluid should have a viscosity sufficient to transport the proppant as the fracturing fluid is conveyed into the boreholes. Accordingly, if the fracturing fluid includes a proppant, the viscosity is preferably at least sufficient to transport the proppant. In one preferred embodiment, the fracturing fluid may be a viscoelastic surfactant.

The surfactants which are utilized to produce fracturing fluid 16 comprise a mixture of (1) a first surfactant that is one or more cationic and/or amphoteric surfactants and (2) at least one anionic surfactant.

The cationic surfactant preferably has only a single cationic group which may be of any charge state (e.g., the cationic group may have a single positive charge or two positive charges). The cationic group preferably is a quaternary ammonium moiety (such as a linear quaternary amine, a benzyl quaternary amine or a quaternary ammonium halide), a quaternary sulfonium moiety or a quaternary phosphonium moiety or mixtures thereof. Preferably the quaternary group is quaternary ammonium halide or quaternary amine, most preferably, the cationic group is quaternary ammonium chloride or a quaternary ammonium bromide.

The amphoteric surfactant preferably contains a single cationic group The cationic group of the amphoteric surfactant is preferably the same as those listed previously for the cationic group of the cationic surfactants. The amphoteric surfactant may be one or more of glycinates, amphoacetates, propionates, betaines and mixtures thereof. Preferably, the amphoteric surfactant is a glycinate or a betaine and, most preferably, the amphoteric surfactant is a linear glycinate or a linear betaine.

The cationic or amphoteric surfactant has a hydrophobic tail (which may be saturated or unsaturated ) Preferably the tail has a carbon chain length from about $C_{12}$–$C_{18}$. Preferably, the hydrophobic tail is obtained from a natural oil from plants Such as one or more of coconut oil, rapeseed oil and palm oil.

Exemplary examples of preferred surfactants include N,N,N trimethyl-1-octadecammonium chloride: N,N,N trimethyl-1-hexadecammonium chloride; and N,N,N trimethyl-1-soyaammonium chloride, and mixtures thereof.

The anionic surfactant may be any complimentary surfactant system known In the art which may be used us to produce a fracturing fluid. For example, the anionic surfactant may be sulfonates, phosphonates, ethoxysulfates and mixtures thereof. Preferably the anionic surfactant is a sulfonate. Most preferably the anionic surfactant is a sulphonate such as sodium xylene sulfonate and sodium naphthalene sulfonate.

The relative amounts of the surfactants which are combined are determined based upon the desired viscosity of the fracturing fluid. In particular, in operation, the viscosity of the fracturing fluid may first be determined. Further, the volume of fracturing fluid which is required may be determined at this time The requisite amount of surfactant to obtain the predetermined viscosity may then be combined with the requisite amount of water to produce the fracturing fluid. Preferably the fracturing fluid has a viscosity from about 15 to about 1000 cP@100 $sec^{-1}$, preferably from about 30 to about 300 cP@100 $sec^{-1}$, and more preferably from about 30 to about 150 cP@100 $sec^{-1}$. The actual viscosity which is produced will depend on a number of factors including the temperature of the initial fracturing fluid 16, the amount of surfactant and the relative amounts of surfactants as well as the total amount of surfactants which are added to the water. Such viscosities may be achieved by adding about 3 to about 100 litres of surfactant per cubic metre of water, preferably from about 3 to about 50 litres and more preferably from about 3 to about 25 litres.

Preferably, the amount of the cationic/amphoteric surfactant and the amount of anionic surfactant which are used is preferably sufficient to neutralize, or at least essentially neutralize, the charge density of the surfactants. Accordingly, if the cationic surfactant is N,N,N, trimethyl-1-octadecammonium chloride and the anionic surfactant is sodium xylene sulfonate, then the surfactants may be combined in a ratio from about 1:4 to about 4:1 by volume to obtain a clear viscoelastic gel which is capable of transporting a proppant. Such a fracturing fluid exhibits a fairly low surface tension in the area of about 30 dynes/cm$^2$ which aids in rapid flow back for cleaning up the well after fracturing. Such fluid also has a functional temperature range of about 10 to about 60° C.

Figure 2:
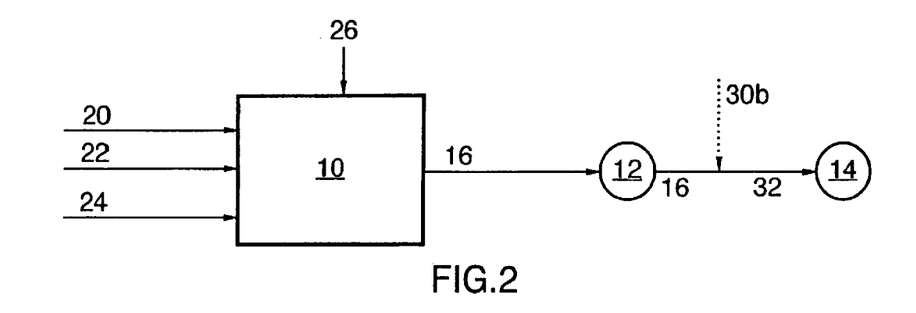
FIG. 2 is a schematic drawing of an alternate process for producing an initial fracturing fluid in accordance with the instant invention.
Figure 3:
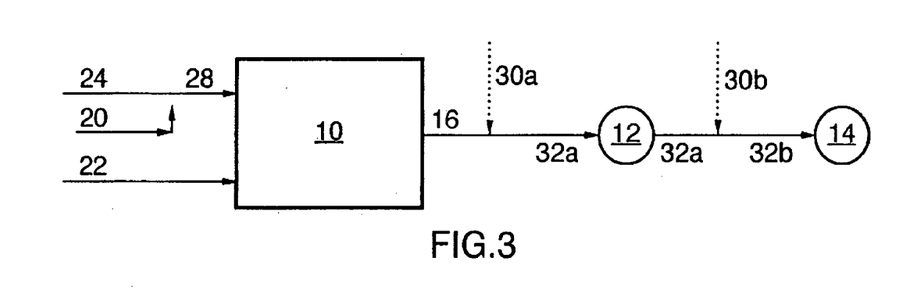
FIG. 3 is a schematic drawing of a further alternate process for producing an initial fracturing fluid in accordance with the instant invention.

The fracturing fluid can be batch mixed or mixed on a continuous basis (e.g a continuous stirred tank reactor such as a blender may be used so that as the mixture is prepared it is introduced into a borehole). As shown in FIG. 1, cationic/amphoteric surfactant 20 and anionic surfactant 22 are individually added to mixing tank 10 with water 24 to produce initial fracturing fluid 16. Referring to FIG. 2, in this alternate embodiment, cationic/amphoteric surfactant 20, anionic surfactant 22 and water 24 are individually added to mixing tank 10. Subsequently, or at the same time, proppant 26 is added to produce fracturing fluid 16 which contains proppant 26. In the alternate embodiment of FIG. 3, cationic/amphoteric surfactant 20 is combined with water 24 to produce water/surfactant blend 28 prior to introducing blend 28 and anionic surfactant 22 into tank 10. It will be appreciated that other permutations or combinations of combining the surfactants, water and, optionally, a proppant together may be utilized. For example, some or all of water 24 may be present in mixing tank 10 prior to introducing surfactants 20, 22 into tank 10. Further, proppant 26 may be added subsequent to the completion of the formation of initial fracturing fluid 16 in tank 10 or at any time during the production thereof. Further, one or more of surfactants 20 or 22 may be combined with water 24 prior to introducing a combined mixture into tank 10.

Initial fracturing fluid 16 may be energized or foamed as is known in the art. Typically, the word "energized" refers to a fluid containing less than 63 volume percent of a foaming agent (e.g. nitrogen, carbon dioxide or mixtures thereof). Typically, the term "foamed" refers to a fluid that contains more than 63 volume percent of a foaming agent. While nitrogen and carbon dioxide are described as examples of foaming agents which may be used it is to be appreciated that in accordance with the instant invention, any foaming agent known in the art may be utilized.

As shown in FIG. 1, foaming agent 30 may be added upstream from pump 12 to produce foamed initial fracturing fluid 32. Alternately, as shown in FIG. 2, foaming agent 30 may be added downstream from pump 12 to produce foamed initial fracturing fluid 32. In the further alternate embodiment of FIG. 3, foaming agent 30a may be added upstream from pump 12 to produce foamed initial fracturing fluid 32a and an additional amount of foaming agent 30b may be added downstream of pump 12 to produce foamed initial fracturing fluid 32b.

Particulate material, such as clay and coal fines, may swell upon exposure to the fracturing fluid. This may result in the fines becoming dislodged and migrating in a formation or fracture during a fracturing operation. In either case, the swelling or migration of the particulate material can reduce the porosity of at least a portion of the formation or fracture and/or block at least some of the passages in the formation or fracture. It has surprisingly been determined that cationic and amphoteric surfactants taken individually or combined, can at least reduce and, preferably, effectively prevent any such swelling or migration and therefore stabilize the particulate material. Without being limited by theory, it is believed that, due to the single cationic group in the cationic/amphoteric surfactants as disclosed herein, the cationic/amphoteric surfactants are temporarily plated on the formation during a fracturing operation due to the charged density of the particulate material. For example, without being limited by theory, if the surfactant has a cationic group comprising a quaternary ammonium salt, and the particulate material is clay, then the quaternary nitrogen can be adsorbed on the cationic exchange sites of the clay. Accordingly, due to the charge density of the clay particles and of the cationic group, the cationic surfactant effectively is plated on the formation thereby preventing the clay from either swelling or migrating. Depending upon the concentration of chemicals used, which is dependent upon the viscosity required for the fracturing process, all or part of the cationic surfactant and/or the amphoteric surfactant can be adsorbed on the formation clays (for conventional wells or on coal fines for coal bed methane wells.) Thus, the flow back water may contain very minimal amounts of the cationic/amphoteric surfactant.

In producing viscoelastic surfactants which need a clay stabilization action, such as those disclosed in U.S. Pat. No. 4,725,372 clay stabilization agents such as inorganic salts have typically been added in at least about 3 weight per cent based on the total weight of the fracturing fluid. In accordance with the instant invention, such amounts of salt are not required. In accordance with one aspect of the instant invention, a fracturing fluid for use in a formation containing particulate materials such as coal or a clay fines, may be prepared with essentially no separate clay stabilization agent added during the preparation of initial fracturing fluid 16 or any recycled fracturing fluid 40. It is to be appreciated, that, if desired, some salt may be present (such as may inherently occur from the production of the surfactants or from leaching of salts from a borehole). However, if a salt is present, then preferably the salt is present in less than about 0.5 weight percent.

The production of recycled fracturing fluid 40 will now be described with reference to the alternate embodiments exemplified in FIGS. 4, 5 and 6.

Figure 4:
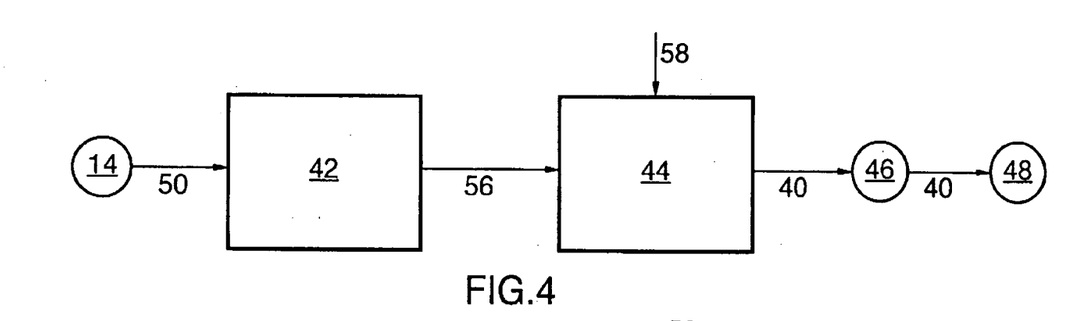
FIG. 4 is a schematic drawing of a process for producing a recycled fracturing fluid in accordance with the instant invention.

Referring to FIG. 4, in this embodiment, recovered fluid 50 is obtained from borehole 14 by any means known in the art, such as by flowback or cleanup. Further, when pressure is relieved in borehole 14, some of the spent fracturing fluid may flow out of borehole 15 as recovered fluid 50.

In accordance with another aspect of this invention, recovered fluid 50 is used in one or more subsequent fracturing operations and as such is a first fracturing fluid. Recovered fluid is preferably treated to remove excess suspended or entrained material and to obtain particulate lean stream 56. Particulate lean stream 56 is then used to produce recycled fracturing fluid 40.

Recovered fluid 50 may be provided to filter means 42 which may be any means known in the art for removing suspended or entrained material from recovered fluid 50. It will be appreciated by those skilled in the art that not all suspended or entrained particulate material in recovered fluid 50 need be removed. It will also be appreciated that if recovered fluid 50 contains additional contaminants, such as oil or other material which would interfere with the use of recovered fluid 50 as a fracturing fluid, then recovered fluid 60 may also be treated to remove some or all of such contaminants as may be necessary or desirable. The amount of such material which is removed by filter means 42 is at least that amount which is required to prevent the use of recycled fluid 50 from deleteriously affecting a subsequent fracturing operation. It will be appreciated that in some applications, a particulate removal step may not be required. To this end, any such filter means known in the art may be utilized such as a settling tank, a physical filter through which the fluid is passed, a centerfuge, a cyclone or the like. As shown in the embodiment of FIG. 5, filter means 42 may consist of only one or more settling tanks 52 which define the settling stage. Alternately, as shown in FIG. 6, filter means 42 may comprise one or more settling tanks 52 and one or more filters 54. Preferably, filters 54 are positioned downstream from settling tank 52.

Particulate lean stream 46 is obtained from filtering means 42. Particulate lean stream 56 may have a sufficient viscosity so as to enable particulate lean stream 56 itself to be utilized as a recycled fracturing fluid. In such a case, particulate lean stream 56 may be fed directly to pump 46 and then to a subsequent borehole 48 which is to be treated. Alternately, additional surfactant may be required to adjust the viscosity of particulate lean stream 56 to a pre-determined level so as to obtain recycled fracturing fluid 40. In the latter case, particulate lean stream 56 is mixed with such additional surfactant as may be required to obtain the desired viscosity. To this end, any mixing means known in the art may be utilized For example, a blender flow reactor may be utilized. Alternately, as shown in FIG. 4 a second mixing tank 44 may be provided. Additional makeup surfactant 58 is combined with particulate lean stream 56 in mixing tank 44 (e.g. a blender which may be baffled or unbaffled) to produce recycled fracturing fluid 40. Due to the plating out of the surfactant containing the cationic group in borehole 14, the relative amount of cationic/amphoteric surfactant to anionic surfactant in recovered fluid 50 is reduced. In practice, it has been found that some of the anionic surfactant is lost during a fracturing cycle. Such losses are believed to be related solely to process losses (namely, the deposition or plating out of some of the anionic surfactants on the processing equipment). Accordingly, recovered fluid 50 is typically substantially depleted with respect to the cationic/amphoteric surfactant but may only have a relatively small reduction in the concentration of the anionic surfactant. Accordingly, to produce recycled fluid, a relatively large amount of cationic/amphoteric surfactant is typically added compared to the amount of anionic surfactant which may need to be added. The concentration of the surfactants in the recovered fluid can be quantified by. Known laboratory analytical methods such as the quaternary ammonium concentration by calorimetric (Hack method 8337) and the sulfonate content by ionchromatography.

In accordance with one aspect of the instant invention, recycled fracturing fluid is prepared by determining the viscosity which is required for the subsequent fracturing operation. The viscosity of recovered fluid 50 is determined (either before or after the removal of the entrained or suspended material). The amount and types of surfactants which are added in mixing tank 44 are determined so as to alter the viscosity of particulate lean stream 56 to the predetermined viscosity which has been selected for recycled fracturing fluid stream 40. According to one embodiment, it is assumed that only the cationic/amphoteric surfactant is lost during a fracturing operation. Accordingly, additional amounts of the cationic/amphoteric surfactant are added in aliquots and the fluid blended after each aliquot until the predetermined viscosity is achieved. Accordingly, the recycled fracturing fluid may be prepared relatively quickly without conducting a chemical analysis of recovered fluid 50.

In accordance with another embodiment of the instant invention, the volume of recovered fluid 50 is insufficient to produce the required volume of recycled fracturing fluid 40 which is to be used in subsequent borehole 48. In such a case, the viscosity of recovered fluid 50 is determined (either before or after filter means 42). The volume of recovered fluid 50 is also determined. Based upon this determination, the requisite amount of makeup water 60 is added (e.g. to mixing tank 44) to produce the required volume of recycled fluid 40. In such a case, the amount and type of surfactants which must be added to produce recycled fracturing fluid 40 is also increased. Notionally, sufficient surfactant must be added to (1) replace surfactant which is lost during the official fracturing operation and (2) to produce the desired viscosity in the additional makeup water added by a stream 60 (see FIG. 6). It will be appreciated that if the required viscosity of recycled fracturing fluid 40 is less than the required viscosity for initial fracturing fluid 16, that low quantities of anionic and cationic/amphoteric surfactant need be added. It will be appreciated that makeup water 16 may be added at any stage during the processing of recovered fluid 50 but that cationic/amphoteric surfactant stream 20 and anionic surfactant stream 22 are preferably added subsequent to filtration means 42. It will be appreciated that surfactants 20 and 22, make up water 60 and recover fluid 50 may be mixed in any order.

Figure 5:
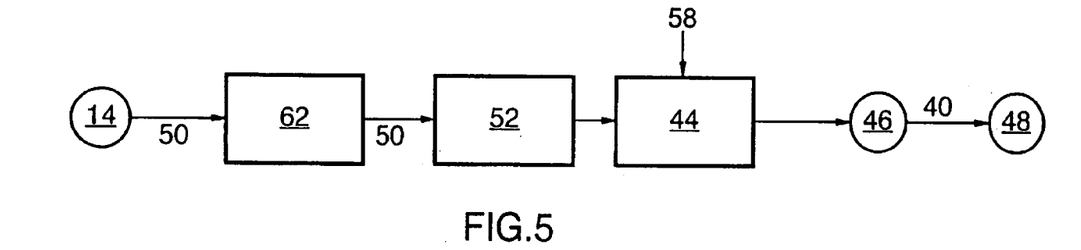
FIG. 5 is a schematic drawing of an alternate process for producing a recycled fracturing fluid in accordance with the instant invention.

In the embodiment of FIG. 5, flow back tank 62 is provided for receiving recovered fluid 50. Flow back tank 62 acts as a storage tank for storing recovered fluid 50 until it is required for use. It will be appreciated that flow back tank 62 may function as a settling tank if recovered fluid 50 is stored therein for an extended period of time.

Figure 6:
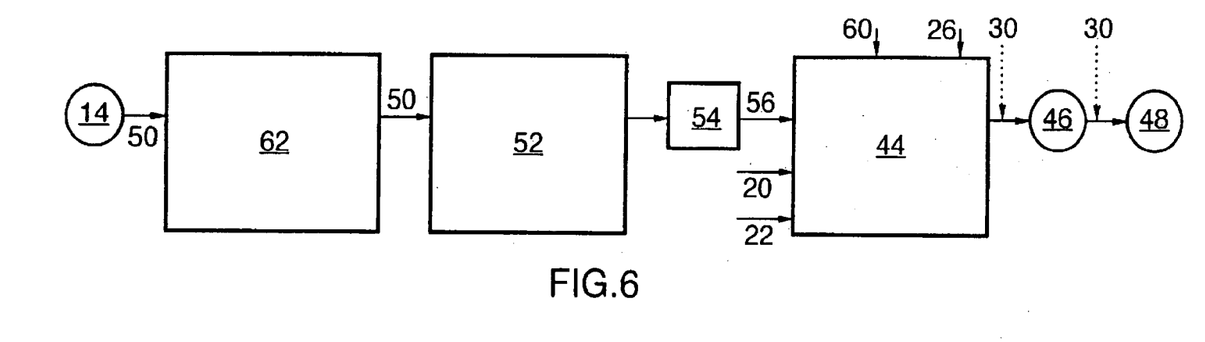
FIG. 6 is a schematic drawing of a further alternate process for producing a recycled fracturing fluid in accordance with the instant invention; and, FIG. 7 is a graph of viscosity at combined surfactant concentrations against temperature.

In the embodiment of FIG. 6, filtering means 42 comprises settling tank 52 and filter 54 which utilizes a filter media through which some or all of recovered fluid 50 is passed. Such an embodiment may be utilized if recovered fluid 50 contains suspended or entrained material which cannot be separated due to gravity or which cannot be removed by gravity in a reasonable period of time.

It will be appreciated that the additional steps for preparing a fracturing fluid as discussed previously with respect to initial fracturing fluid 16 may also be utilized in preparing recycled fracturing fluid 40. In particular, as shown in FIG. 6, proppant 26 may be added, such as to mixing tank 44. Further, a foaming agent may be added before and/or after pump 46.

It will be appreciated by a person skilled in the art that the various embodiments may be used individually or in any combination or permutation thereof to obtain a improved process for fracturing a formation.

EXAMPLE 1

Fracturing fluids were prepared by combining N,N,N trimethyl-1-octadecammonium chloride (FAC-1X) with sodium xylene sulfonate (FAC-2X) in the concentrations which are set out below in Table 1.

TABLE 1

| FAC-1X L/m³ | FAC-1X % | FAC-2X L/m³ | FAC-2X % |
|---|---|---|---|
| 3.0 | 0.3 | 3.0 | 0.3 |
| 7.0 | 0.7 | 5.5 | 0.55 |
| 10.0 | 1.0 | 8.0 | 0.8 |
| 15.0 | 1.5 | 10.0 | 1.0 |
| 20.0 | 2.0 | 13.0 | 1.3 |
| 25.0 | 2.5 | 14.5 | 1.45 |
| 30.0 | 3.0 | 18.0 | 1.8 |
| 35.0 | 3.5 | 20.0 | 2.0 |
| 40.0 | 4.0 | 20.5 | 2.05 |

In each case, the surfactants were mixed with water and then blended together with an overhead blender at low speed. The resulting fluid was placed in a pressured Fann 50 rheometer and the viscosity measured over a measured range of temperatures The results are set out in FIG. 7.

Figure 7:
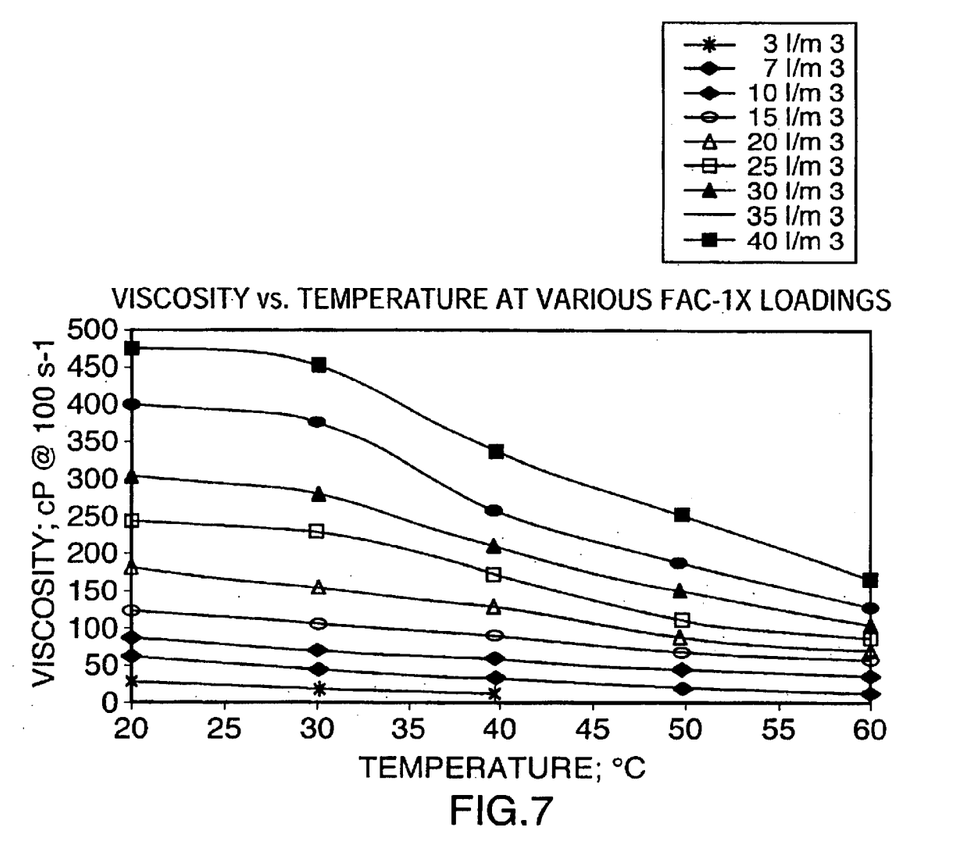

It will be understood that the data presented in FIG. 7 is exemplary in nature As can be seen from FIG. 7 a wide range of concentrations of anionic surfactants and surfactants containing a cationic group will result in gels having a high viscosity.

EXAMPLE 2

A viscoelastic fracturing fluid was prepared by mixing N,N,N trimethyl-1-octadecammonium chloride and sodium xylene sulphonate at a loading rate of 4 litres per cubic metre each. The resultant fracturing fluid had a viscosity on Fann 35 at 100 rpm of 5 cP, at 300 rpm of 7 cP and at 600 rpm of 10 cP. Proppant was added to the fracturing fluid at a rate of 1600 kg/m³ of clean fluid and the fracturing fluid was energized by injecting $CO_2$ therein. The energized fluid was then pumped into a borehole and used to conduct a standard fracturing operation. After the fracturing operation, the flow back fluid was collected and pumped into a tank. The recovered fluid was subjected to a settling operation for about 24 hours during which time sand and fines in the recovered fluid settled out. Eighty per cent of the recovered fluid was then used for producing recycled fracturing fluid.

The volume of fluid required for a fracturing operation for the next borehole was determined and a sufficient amount of fresh city water was added to the flow back water to produce the requisite volume. Additional amounts of each surfactant was added to produce a total loading of 4 litres per cubic metre of fracturing fluid of each of the surfactants in the recycled fracturing fluid. After five recycles. This same loading produced a fracturing fluid having a viscosity on Fann 35 of 5 cP at 100 rpm, 9 cP at 300 rpm and 12 cP at 600 rpm. After forty recycles, it was determined that the loading of each of the surfactants could be reduced to 2 litres per cubic metre fracturing fluid to achieve the same viscosity yield yet still stabilize clay fines in the boreholes. These fracturing operations demonstrate that the amount of surfactant that needs to be added to a fracturing fluid may be based on the required viscosity of a recycled fracturing fluid and not by analyzing the composition of the recovered fluid to determine the total loading of surfactant therein. The viscosity of the recovery fluid and of the recycled fracturing fluid can be monitored using a Marsh funnel such as is used for drilling muds

EXAMPLE 3

In order to demonstrate the effectiveness of a surfactant according to the instant invention to stabilize fines in a borehole, a capillary section test was conducted as is known in the industry. Pursuant to the test, a core sample from a Viking core which are known to contain clay fines was ground to a fine powder. Various fracturing fluids were prepared. Ground core sample was added at a rate of 2 g of the fine powder to 25 ml of the fracturing fluid The mixture was then stirred for 20 minutes to obtain a mixed solution at the end of 20 minutes 2 ml of the mixed solution was placed in a capillary suction test cell to commence the test. The test cell was in contact with a sheet of blotting paper. 2 wires (electrodes) were affixed to the blotting paper. Water is pulled from the test cell by capillary action and the time required for the water to move between the first and second wires is measured. The water coming into contact with the first wire (electrode) starts an electronic timer. When the water comes in contact with the second wire (electrode), the electronic timer is stopped. If the particulate material in the core sample interacts with, and hence holds, the water in the fracturing fluid strongly, the water will flow all the more slowly between the electrodes resulting in a longer capillary suction time.

The following tables set out the results of two different sets of tests which were conducted utilizing different Viking core samples. Table 2 sets out the runs of a typical Viking core sample and Table 3 sets out the results of a Viking core sample that had relatively clean sand. The tests were conducted using tap water mixed with potassium chloride (KCl), tap water mixed with choline chloride (CC-2), tap water mixed with a permanent clay stabilizer which is an organic polymer with multiple cationic groups and which is sold under the trade mark CS-2, and test fluid 1 which is prepared in accordance with the instant invention. Test fluid 1 consisted of a mixture of N,N,N, trimethyl- 1octadecammonium chloride and sodium xylene sulfonate combined with water at a rate of 3 litres per cubic metre of each surfactant. Each test was performed three times and the average results are provided in the following table.

TABLE 2

| Sample of mixture | CST (s) Average pH = 10.5 | CST (s) Average neutral pH |
|---|---|---|
| Tap water | 408.5 | 179.8 |
| Tap water w/3% KCl | 48.6 | — |
| Tap water w/5% KCl | 41.3 | — |
| Tap water w/1 L/m3 CC-2 | 182.0 | — |
| Tap water w/1 L/m3 CS-2 | 65.7 | — |
| Tap water w/1 L/m3 CC-2 and 1 L/m³ CS-2 | 45.9 | — |
| Tap water w/3% KCl + 1 L/m3 of CS-2 | 34.3 | — |
| Tap water w/Test Fluid 1 | — | 18.5 |

TABLE 3

| Sample of mixture | CST (s) Average pH = 10.5 | CST (s) Average neutral pH |
|---|---|---|
| Tap water | 75.6 | 52.9 |
| Tap water w/3% KCl | 30.7 | 47.6 |
| Tap water w/5% KCl | 27.8 | 39.0 |
| Tap water w/1 L/m3 CC-2 | 45.3 | 49.0 |
| Tap water w/1 L/m3 CS-2 | 24.9 | 23.9 |
| Tap water w/1 L/m3 CC-2 and 1 L/m³ CS-2 | 23.2 | 29.7 |
| Tap water w/3% KCl + 1 L/m3 of CS-2 | 22.2 | — |
| Tap water w/Test Fluid 1 | — | 14.5 |

The foregoing test demonstrates that test fluid 1 produced a short capillary suction test time demonstrating that the fluid does not interact substantially with the test sample and therefore does not result in substantial clay swelling.

What is claimed is:

1. A method of fracturing a formation comprising:
   a) preparing a first fracturing fluid;
   b) pumping the first fracturing fluid into the formation at an elevated pressure;
   c) reducing the pressure and recovering fluid from the formation;
   d) removing suspended or entrained material from the recovered fluid; and,
   e) using the recovered fluid as a recycled fracturing fluid
   wherein steps (a)–(c) comprise a first fracturing operation and step (e) is a second fracturing operation.

2. The method as claimed in claim 1 wherein the recovered fluid is used to produce the recycled fracturing fluid.

3. The method as claimed in claim 2 wherein the first fracturing fluid comprises:
   a) a thickening compound comprising:
   b) a first surfactant selected from the group consisting of a cationic having a single cationic group, an amphoteric surfactant and a mixture thereof; and,
   c) an anionic surfactant; and,
   d) water
   and the method further comprises determining the viscosity of the recovered fluid and adding surfactant to the recovered fluid to obtain a predetermined viscosity.

4. The method as claimed in claim 3 wherein the amount of surfactant that is added to the recovered fluid is based only on the viscosity of the recovered fluid.

5. The method as claimed in claim 3 wherein the amount of surfactant that is added to the recovered fluid is selected to replace surfactant which is removed from the first fracturing fluid during a single fracturing operation.

6. The method as claimed in claim 5 wherein the surfactant which is added to the recovered fluid essentially comprises the first surfactant.

7. The method as claimed in claim 2 further comprising the step of limiting the salt added to the first fracturing fluid whereby the recovered fluid has a salt content of less than about 0.5 wt. % based on the total weight of the recovered fluid.

8. The method as claimed in claim 3 further comprising determining the relative amounts of the first surfactant and the anionic surfactants in the recovered fluid and adding surfactant to the recovered fluid to produce the recycled fracturing fluid having a predetermined viscosity.

9. The method as claimed in claim 2 wherein step (d) comprises essentially only a settling stage.

10. The method as claimed in claim 2 wherein steps (b)–(c) of claim 9 comprise a single fracturing operation and the method further comprises:
    a) determining an amount of recycled fracturing fluid that is required for a further fracturing operation; and,
    b) determining an amount of surfactant to be added to produce the recycled fracturing fluid having a predetermined viscosity.

11. The method as claimed in claim 10 wherein the amount of surfactant that is added to the recovered fluid is based only on the viscosity of the recovered fluid.

12. The method as claimed in claim 10 wherein the amount of surfactant that is added to the recovered fluid is selected to replace surfactant which is removed from the first fracturing fluid during a single fracturing operation.

13. The method as claimed in claim 10 further comprising adding additional water to the recovered fluid to produce the amount of recycled fracturing fluid that is required for the further fracturing operation, and the amount of surfactant that is added to the recovered fluid is selected to replace surfactant which is removed from the first fracturing fluid during a single fracturing operation as well as to increase the viscosity of the additional water whereby the recycled fracturing fluid has the predetermined viscosity.

14. A method of fracturing a formation comprising:
    a) preparing a first fracturing fluid;
    b) pumping the first fracturing fluid into the formation at an elevated pressure;
    c) reducing the pressure and recovering fluid from the formation;
    d) removing suspended or entrained material from the recovered fluid;
    e) using the recovered fluid to produce a recycled fracturing fluid; and,
    f) limiting the salt added to the first fracturing fluid whereby the recovered fluid has a salt content of less than about 0.5 wt. % based on the total weight of the recovered fluid
    wherein steps (a)–(c) comprise a first fracturing operation and step (e) is a second fracturing operation.

15. The method as claimed in claim 14 wherein salt is not added during step (a) to produce the first fracturing fluid.

16. A method of fracturing a formation comprising:
    a) preparing a first fracturing fluid;
    b) pumping the first fracturing fluid into the formation at an elevated pressure;
    c) reducing the pressure and recovering fluid from the formation;
    d) subjecting recovered fluid essentially only to a settling operation to remove suspended or entrained material from the recovered fluid; and,
    e) using the recovered fluid to produce a recycled fracturing fluid.

17. The method as claimed in claim 16 further comprising limiting the salt added to the first fracturing fluid whereby the recovered fluid has a salt content of less than about 0.5 wt. % based on the total weight of the recovered fluid.

18. The method as claimed in claim 16 further comprising determining the viscosity of the recovered fluid and adding surfactant to the recovered fluid to obtain a predetermined viscosity.

19. The method as claimed in claim 18 wherein the amount of surfactant that is added to the recovered fluid is based only on the viscosity of the recovered fluid.

20. The method as claimed in claim 18 wherein steps (b)–(c) of claim 16 comprise a single fracturing operation and the amount of surfactant that is added to the recovered fluid is selected to replace surfactant which is removed from the first fracturing fluid during a single fracturing operation.

21. The method as claimed in claim 20 wherein the first fracturing fluid comprises:
    (a) a first surfactant selected from the group consisting of a cationic having a single cationic group, an amphoteric surfactant and a mixture thereof; and,
    (b) an anionic surfactant;
    and the surfactant which is added to the recovered fluid essentially comprises the first surfactant.

22. The method as claimed in claim 21 further comprising determining the relative amounts of the first surfactant and the anionic surfactants in the recovered fluid and adding surfactant to the recovered fluid to produce the recycled fracturing fluid having a predetermined viscosity.

* * * * *